US012679533B2

(12) United States Patent
Tsujimoto

(10) Patent No.: US 12,679,533 B2
(45) Date of Patent: Jul. 14, 2026

(54) ATTITUDE CONTROL DEVICE

(71) Applicant: HONDA MOTOR CO., LTD., Tokyo (JP)

(72) Inventor: Ryota Tsujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 279 days.

(21) Appl. No.: 18/171,958

(22) Filed: Feb. 21, 2023

(65) Prior Publication Data

US 2023/0264812 A1 Aug. 24, 2023

(30) Foreign Application Priority Data

Feb. 22, 2022 (JP) ................................. 2022-025390

(51) Int. Cl.
| | |
|---|---|
| *B64C 29/00* | (2006.01) |
| *B64D 31/10* | (2006.01) |
| *G05D 1/00* | (2006.01) |
| *G05G 1/08* | (2006.01) |

(52) U.S. Cl.
CPC .......... *B64C 29/0025* (2013.01); *B64D 31/10* (2013.01); *G05D 1/0858* (2013.01)

(58) Field of Classification Search
CPC ..... B64C 29/0025; B64C 15/00; B64C 27/08; B64C 29/02; B64D 31/10; B64D 27/24; G05D 1/0858; G05D 1/0833; B64U 2201/00; B64U 10/13
See application file for complete search history.

(56) References Cited

U.S. PATENT DOCUMENTS

| | | | |
|---|---|---|---|
| 2015/0097075 A1* | 4/2015 | Agnihotri | ............... B64C 27/10 244/17.13 |
| 2015/0360794 A1 | 12/2015 | Certain et al. | |
| 2017/0152033 A1* | 6/2017 | Allen | ...................... B64C 27/57 |
| 2020/0166955 A1* | 5/2020 | Tanaka | .................... B64C 27/06 |
| 2025/0074578 A1* | 3/2025 | Horn | ........................ G05D 1/46 |

FOREIGN PATENT DOCUMENTS

| | | |
|---|---|---|
| CN | 109388145 A | 2/2019 |
| JP | 2014-227155 A | 12/2014 |
| WO | 2018/157897 A1 | 9/2018 |

OTHER PUBLICATIONS

Chinese Office Action dated Nov. 15, 2025 issued in corresponding Chinese application No. 202310142596.8; English machine translation included (20 pages).
"Design and Modelling of a Quadrotor Helicopter with Variable Pitch Rotors for Aggressive Manoeuvres", Arnold Pretorius et al., Preprints of the 19th World Congress The International Federation of Automatic Control, pp. 12208-12213, Published Aug. 24-29, 2014 (6 pages).

* cited by examiner

*Primary Examiner* — Nga X Nguyen
(74) *Attorney, Agent, or Firm* — Rankin, Hill & Clark LLP

(57) ABSTRACT

A rotor control device for performing attitude control of a fuselage of an aircraft includes a VTOL rotor control unit for controlling each rotor based on a roll moment command value, a pitch moment command value, and a yaw moment command value. When the magnitude of the roll moment command value or the magnitude of the pitch moment command value is equal to or greater than a threshold, the VTOL rotor control unit controls each rotor without using the yaw moment command value.

8 Claims, 7 Drawing Sheets

Figure 5:
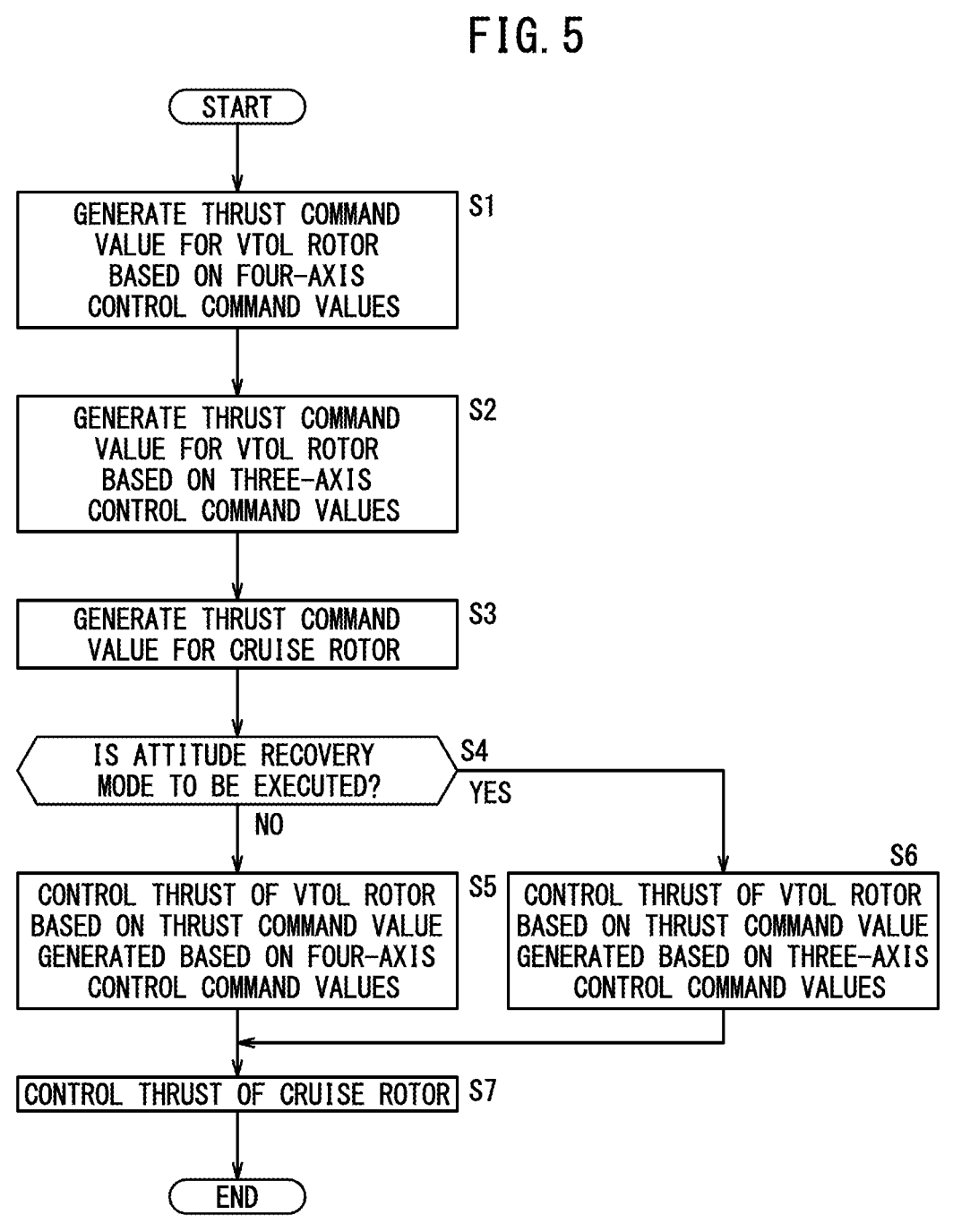

```
                    ┌─────────────┐
                    │    START    │
                    └──────┬──────┘
                           │
           ┌───────────────▼───────────────┐  S1
           │   GENERATE THRUST COMMAND     │
           │    VALUE FOR VTOL ROTOR       │
           │     BASED ON FOUR-AXIS        │
           │   CONTROL COMMAND VALUES      │
           └───────────────┬───────────────┘
                           │
           ┌───────────────▼───────────────┐  S2
           │   GENERATE THRUST COMMAND     │
           │    VALUE FOR VTOL ROTOR       │
           │     BASED ON THREE-AXIS       │
           │   CONTROL COMMAND VALUES      │
           └───────────────┬───────────────┘
                           │
           ┌───────────────▼───────────────┐  S3
           │   GENERATE THRUST COMMAND     │
           │    VALUE FOR CRUISE ROTOR     │
           └───────────────┬───────────────┘
                           │
            ╱──────────────▼──────────────╲  S4
           ⟨  IS ATTITUDE RECOVERY          ⟩──── YES
           ⟨  MODE TO BE EXECUTED?          ⟩
            ╲──────────────┬──────────────╱
                           │ NO
```

| CONTROL THRUST OF VTOL ROTOR BASED ON THRUST COMMAND VALUE GENERATED BASED ON FOUR-AXIS CONTROL COMMAND VALUES   S5 | CONTROL THRUST OF VTOL ROTOR BASED ON THRUST COMMAND VALUE GENERATED BASED ON THREE-AXIS CONTROL COMMAND VALUES   S6 |
|---|---|

```
           ┌───────────────────────────────┐
           │ CONTROL THRUST OF CRUISE ROTOR │  S7
           └───────────────┬───────────────┘
                           │
                    ┌──────▼──────┐
                    │     END     │
                    └─────────────┘
```

ATTITUDE CONTROL DEVICE

CROSS-REFERENCE TO RELATED APPLICATIONS

This application is based upon and claims the benefit of priority from Japanese Patent Application No. 2022-025390 filed on Feb. 22, 2022, the contents of which are incorporated herein by reference.

BACKGROUND OF THE INVENTION

FIELD OF THE INVENTION

The present invention relates to an attitude control device, and a control method for the attitude control device.

DESCRIPTION OF THE RELATED ART

JP 2014-227155 A discloses a multicopter including a plurality of rotors for generating lift. In the multicopter, in order to maintain the attitude of the fuselage, simultaneous equations including a plurality of conditional expressions are solved to set the thrust of each rotor.

SUMMARY OF THE INVENTION

In the technique disclosed in JP 2014-227155 A, when the attitude of the fuselage is largely lost, an excessive thrust may be set for some rotors. When the set thrust exceeds the capability of the rotor, there arises a problem that the attitude of the fuselage cannot be stabilized.

An object of the present invention is to solve the above-mentioned problem.

According to a first aspect of the present invention, there is provided an attitude control device that performs attitude control of a fuselage of an aircraft including a plurality of rotors each configured to generate thrust in a vertical direction, the attitude control device comprising: a roll moment command value calculation unit configured to calculate a command value of a roll moment to be applied to the fuselage; a pitch moment command value calculation unit configured to calculate a command value of a pitch moment to be applied to the fuselage; a yaw moment command value calculation unit configured to calculate a command value of a yaw moment to be applied to the fuselage; a rotor control unit configured to control each of the rotors based on the command value of the roll moment, the command value of the pitch moment, and the command value of the yaw moment; and a determination unit configured to make one of: a determination as to whether or not a magnitude of the command value of the roll moment is equal to or greater than a first threshold; a determination as to whether or not a magnitude of the command value of the pitch moment is equal to or greater than a second threshold; or a determination as to whether or not a magnitude of a command value of a resultant moment obtained from the command value of the roll moment and the command value of the pitch moment is equal to or greater than a third threshold, wherein when the magnitude of the command value of the roll moment is determined to be equal to or greater than the first threshold by the determination unit, when the magnitude of the command value of the pitch moment is determined to be equal to or greater than the second threshold by the determination unit, or when the magnitude of the command value of the resultant moment is determined to be equal to or greater than the third threshold by the determination unit, the rotor control unit controls each of the rotors based on the command value of the roll moment and the command value of the pitch moment without using the command value of the yaw moment, or the rotor control unit corrects the command value of the yaw moment in a manner so that a magnitude of the command value of the yaw moment is reduced and controls each of the rotors based on the command value of the roll moment, the command value of the pitch moment, and the command value of the yaw moment that has been corrected.

According to a second aspect of the present invention, there is provided a control method for an attitude control device that performs attitude control of a fuselage of an aircraft including a plurality of rotors each configured to generate thrust in a vertical direction, the control method comprising: calculating a command value of a roll moment to be applied to the fuselage; calculating a command value of a pitch moment to be applied to the fuselage; calculating a command value of a yaw moment to be applied to the fuselage; and making one of: a determination as to whether or not a magnitude of the command value of the roll moment is equal to or greater than a first threshold; a determination as to whether or not a magnitude of the command value of the pitch moment is equal to or greater than a second threshold; or a determination as to whether or not a magnitude of a command value of a resultant moment obtained from the command value of the roll moment and the command value of the pitch moment is equal to or greater than a third threshold, wherein when the magnitude of the command value of the roll moment is determined to be equal to or greater than the first threshold, when the magnitude of the command value of the pitch moment is determined to be equal to or greater than the second threshold, or when the magnitude of the command value of the resultant moment is determined to be equal to or greater than the third threshold, each of the rotors is controlled based on the command value of the roll moment and the command value of the pitch moment without using the command value of the yaw moment, or the command value of the yaw moment is corrected in a manner so that a magnitude of the command value of the yaw moment is reduced, and each of the rotors is controlled based on the command value of the roll moment, the command value of the pitch moment, and the command value of the yaw moment that has been corrected.

According to the present invention, the attitude of the fuselage can be stabilized at an early stage.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a flowchart showing a flow of a rotor control process performed by the rotor control device;

DETAILED DESCRIPTION OF THE INVENTION

First Embodiment

Configuration of Aircraft

Figure 1:
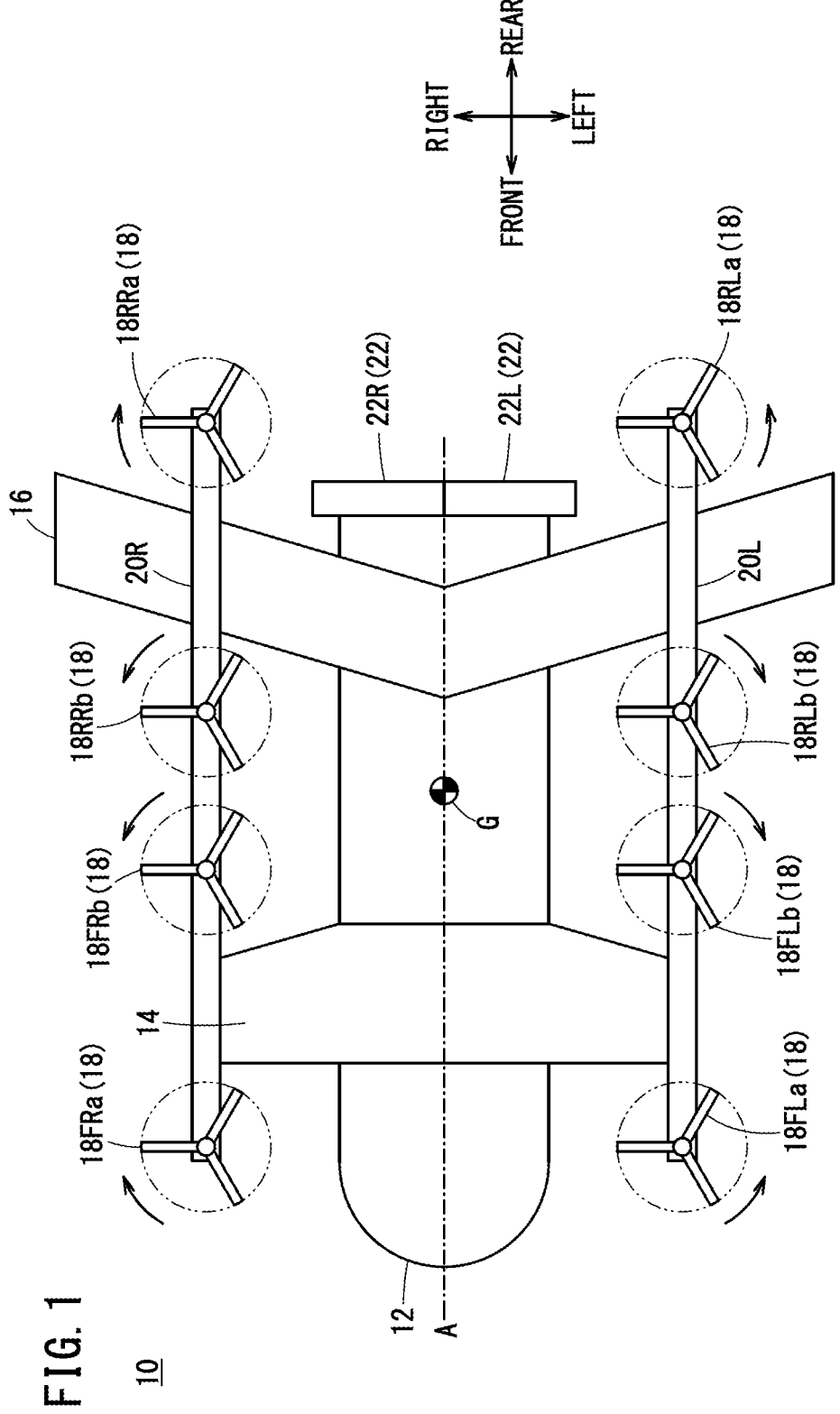
FIG. 1 is a schematic view of an aircraft.

FIG. 1 is a schematic diagram of an aircraft 10. The aircraft 10 of the present embodiment is an electric vertical take-off and landing aircraft (eVTOL aircraft). In the aircraft 10 of the present embodiment, rotors are driven by electric motors. The aircraft 10 of the present embodiment generates vertical thrust and horizontal thrust by the rotors. The aircraft 10 of the present embodiment is a hybrid aircraft. The aircraft 10 of the present embodiment includes a generator and a battery as power sources of the electric motor.

The aircraft 10 includes a fuselage 12. The fuselage 12 is provided with a cockpit, a cabin, and the like. A pilot rides in the cockpit and controls the aircraft 10. Passengers and the like ride in the cabin. The aircraft 10 may be automatically controlled.

The aircraft 10 includes a front wing 14 and a rear wing 16. The front wing 14 is attached forward of a center of gravity G of the fuselage 12. The rear wing 16 is attached rearward of the center of gravity G of the fuselage 12. When the aircraft 10 moves forward, lift is generated in each of the front wing 14 and the rear wing 16.

The aircraft 10 includes eight VTOL rotors 18. The eight VTOL rotors 18 are a rotor 18FL*a*, a rotor 18FL*b*, a rotor 18RL*a*, a rotor 18RL*b*, a rotor 18FR*a*, a rotor 18FR*b*, a rotor 18RR*a*, and a rotor 18RR*b*. Each VTOL rotor 18 corresponds to a rotor of the present invention.

The rotor 18FL*a*, the rotor 18FL*b*, the rotor 18RL*a*, and the rotor 18RL*b* are attached to a boom 20L. The boom 20L extends in the front-rear direction. The boom 20L is attached to the front wing 14 and the rear wing 16. The boom 20L is provided on the left side of the center of gravity G. That is, the rotor 18FL*a*, the rotor 18FL*b*, the rotor 18RL*a*, and the rotor 18RL*b* are disposed on the left side of the center of gravity G.

The rotor 18FR*a*, the rotor 18FR*b*, the rotor 18RR*a*, and the rotor 18RR*b* are attached to a boom 20R. The boom 20R extends in the front-rear direction. The boom 20R is attached to the front wing 14 and the rear wing 16. The boom 20R is provided on the right side of the center of gravity G. That is, the rotor 18FR*a*, the rotor 18FR*b*, the rotor 18RR*a*, and the rotor 18RR*b* are disposed on the right side of the center of gravity G.

When the aircraft 10 is viewed from above, each of the rotor 18FL*a*, the rotor 18RL*a*, the rotor 18FR*b*, and the rotor 18RR*b* rotates counterclockwise. When the aircraft 10 is viewed from above, each of the rotor 18FR*a*, the rotor 18RR*a*, the rotor 18FL*b*, and the rotor 18RL*b* rotates clockwise.

A rotation shaft (not shown) of each of the VTOL rotors 18 extends in the up-down direction. The thrust of each of the VTOL rotors 18 is controlled by adjusting the rotational speed of the rotor and the pitch angle of the blades. Each of the VTOL rotors 18 is used during vertical take-off, during transition from vertical take-off to cruising, during transition from cruising to vertical landing, during vertical landing, during hovering, and the like. Further, each of the VTOL rotors 18 is used during attitude control. The rotation shaft of each of the VTOL rotors 18 may be angled (canted) a few degrees with respect to the up-down direction.

By controlling the thrust of each of the eight VTOL rotors 18, lift thrust is generated. The lift thrust refers to thrust in the vertical direction. The magnitude of the lift thrust is determined according to the sum of the thrusts of the eight VTOL rotors 18.

By controlling the thrust of each of the eight VTOL rotors 18, a roll moment is applied to the fuselage 12. The magnitude of the roll moment is determined according to the difference between the sum of the thrusts of the four VTOL rotors 18 disposed on the left side of the center of gravity G, and the sum of the thrusts of the four VTOL rotors 18 disposed on the right side of the center of gravity G.

The four VTOL rotors 18 disposed on the left side of the center of gravity G indicate the rotor 18FL*a*, the rotor 18FL*b*, the rotor 18RL*a*, and the rotor 18RL*b*. The four VTOL rotors 18 disposed on the right side of the center of gravity G indicate the rotor 18FR*a*, the rotor 18FR*b*, the rotor 18RR*a*, and the rotor 18RR*b*.

By controlling the thrust of each of the eight VTOL rotors 18, a pitch moment is applied to the fuselage 12. The magnitude of the pitch moment is determined according to the difference between the sum of the thrusts of the four VTOL rotors 18 disposed forward of the center of gravity G, and the sum of the thrusts of the four VTOL rotors 18 disposed rearward of the center of gravity G.

The four VTOL rotors 18 disposed forward of the center of gravity G indicate the rotor 18FL*a*, the rotor 18FL*b*, the rotor 18FR*a*, and the rotor 18FR*b*. The four VTOL rotors 18 disposed rearward of the center of gravity G indicate the rotor 18RL*a*, the rotor 18RL*b*, the rotor 18RR*a*, and the rotor 18RR*b*.

By controlling the counter torque in each of the eight VTOL rotors 18, a yaw moment is applied to the fuselage 12. The magnitude of the yaw moment is determined according to the difference between the sum of the counter torques of the four VTOL rotors 18 rotating counterclockwise, and the sum of the counter torques of the four VTOL rotors 18 rotating clockwise.

When the rotation shaft of each of the VTOL rotors 18 is angled (canted) a few degrees with respect to the up-down direction, thrust in the lateral direction of the fuselage 12 is generated by the VTOL rotors 18. In this case, the magnitude of the yaw moment is determined according to, in addition to the above-described difference between the sums of the counter torques, the difference between the moment generated by the thrust generated in the counterclockwise direction of the fuselage 12, and the moment generated by the thrust generated in the clockwise direction of the fuselage 12.

The four VTOL rotors 18 rotating counterclockwise indicate the rotor 18FL*a*, the rotor 18RL*a*, the rotor 18FR*b*, and the rotor 18RR*b*. The four VTOL rotors 18 rotating clockwise indicate the rotor 18FR*a*, the rotor 18RR*a*, the rotor 18FL*b*, and the rotor 18RL*b*.

The aircraft 10 includes two cruise rotors 22. The two cruise rotors 22 are a rotor 22L and a rotor 22R.

The rotor 22L and the rotor 22R are attached to a rear portion of the fuselage 12. The rotor 22L is disposed on the left side of a center line A of the fuselage 12. The rotor 22R is disposed on the right side of the center line A of the fuselage 12.

A rotation shaft (not shown) of each of the cruise rotors 22 extends in the front-rear direction. The thrust of each of the cruise rotors 22 is controlled by adjusting the rotational speed of the rotor and the pitch angle of the blades. Each of the cruise rotors 22 is used during transition from vertical take-off to cruising, during cruising, during transition from cruising to vertical landing, and the like. The rotation shaft of each of the cruise rotors 22 may be angled (canted) a few degrees with respect to the front-rear direction.

By controlling the thrust of each of the two cruise rotors 22, cruise thrust is generated. The cruise thrust refers to thrust in the horizontal direction. The magnitude of the cruise thrust is determined according to the sum of the thrusts of the two cruise rotors 22.

Configuration of Power Supply System

Figure 2:
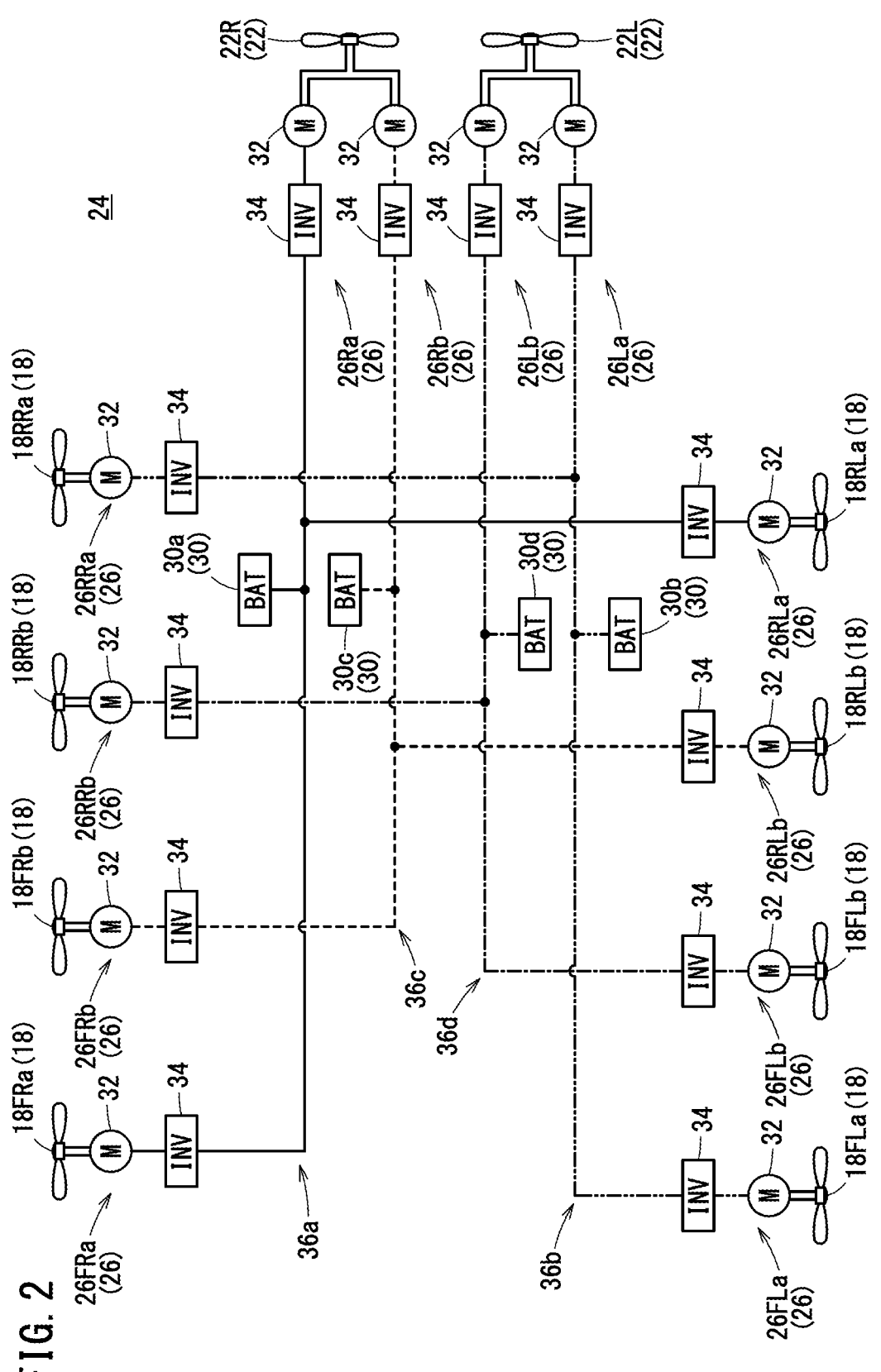
FIG. 2 is a diagram showing the configuration of a power supply system.
Figure 3:
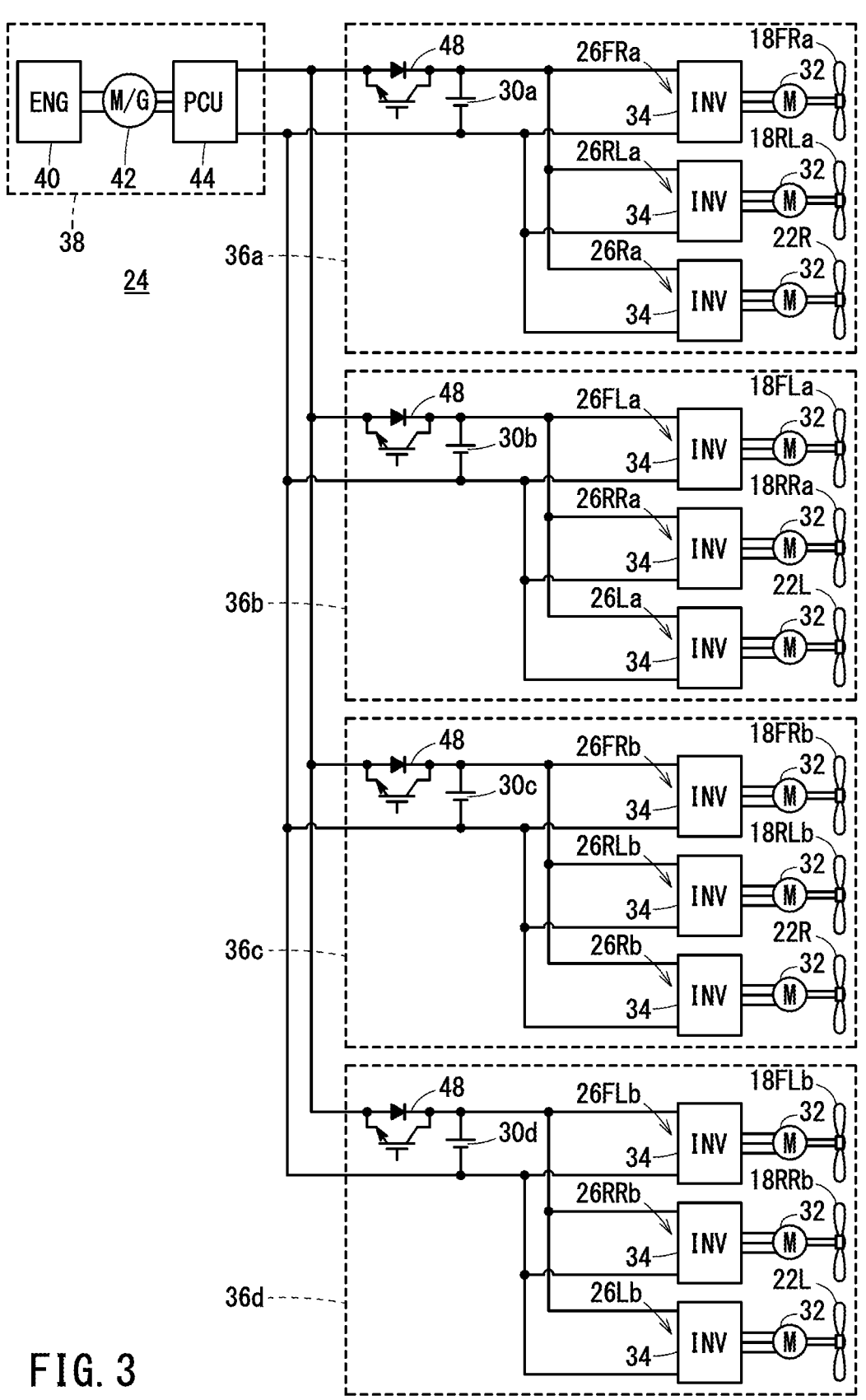
FIG. 3 is a diagram showing the configuration of the power supply system.

FIG. 2 is a diagram showing the configuration of a power supply system 24. FIG. 2 mainly shows a connection relationship between four batteries 30 and twelve electric motors 32. FIG. 3 is a diagram showing the configuration of the power supply system 24.

One drive unit 26 is provided for each VTOL rotor 18. A drive unit 26FL*a* is provided for the rotor 18FL*a*. A drive unit 26FL*b* is provided for the rotor 18FL*b*. A drive unit 26RL*a* is provided for the rotor 18RL*a*. A drive unit 26RL*b* is provided for the rotor 18RL*b*. A drive unit 26FR*a* is provided for the rotor 18FR*a*. A drive unit 26FR*b* is provided for the rotor 18FR*b*. A drive unit 26RR*a* is provided for the rotor 18RR*a*. A drive unit 26RR*b* is provided for the rotor 18RR*b*.

Two drive units 26 are provided for each cruise rotor 22. A drive unit 26L*a* and a drive unit 26Lb are provided for the rotor 22L. A drive unit 26R*a* and a drive unit 26R*b* are provided for the rotor 22R.

One battery 30 is connected to three drive units 26. A battery 30*a* is connected to the drive unit 26FR*a*, the drive unit 26RL*a*, and the drive unit 26R*a*. A battery 30*b* is connected to the drive unit 26FL*a*, the drive unit 26RR*a*, and the drive unit 26L*a*. A battery 30*c* is connected to the drive unit 26FR*b*, the drive unit 26RL*b*, and the drive unit 26R*b*. A battery 30*d* is connected to the drive unit 26FL*b*, the drive unit 26RR*b*, and the drive unit 26L*b*.

Each drive unit 26 includes an electric motor 32 and an inverter 34. The electric motor 32 is a three phase motor. An output shaft (not shown) of the electric motor 32 is coupled to the rotation shaft of each VTOL rotor 18 or the rotation shaft of each cruise rotor 22. The inverter 34 converts the input DC power into three phase AC power and outputs the three phase AC power to the electric motor 32.

As shown in FIG. 3, three drive units 26 and one battery 30 constitute a drive module 36. The drive unit 26FR*a*, the drive unit 26RL*a*, the drive unit 26R*a*, and the battery 30*a* constitute a drive module 36*a*. The drive unit 26FL*a*, the drive unit 26RR*a*, the drive unit 26L*a*, and the battery 30*b* constitute a drive module 36*b*. The drive unit 26FR*b*, the drive unit 26RL*b*, the drive unit 26R*b*, and the battery 30*c* constitute a drive module 36*c*. The drive unit 26FL*b*, the drive unit 26RR*b*, the drive unit 26L*b*, and the battery 30*d* constitute a drive module 36*d*.

Each drive module 36 is connected to a power generation module 38. The power generation module 38 includes an engine 40, a motor generator 42, and a power control unit (hereinafter referred to as PCU) 44.

The engine 40 is a gas turbine engine. The engine 40 may be a reciprocating engine. The motor generator 42 functions as a three phase motor and also functions as a three phase generator. A rotation shaft (not shown) of the motor generator 42 is coupled to an output shaft (not shown) of the engine 40.

The PCU 44 includes an inverter and a converter. The PCU 44 converts the three phase AC power input from the motor generator 42 into DC power and outputs the DC power. Further, the PCU 44 converts the DC power input from each battery 30 into three phase AC power and outputs the three phase AC power to the motor generator 42.

As shown in FIG. 3, each drive module 36 includes a switch 48. Each switch 48 includes a switching element such as an IGBT and a diode. Each switch 48 always allows the supply of electric power from the power generation module 38 to the drive module 36. When each switch 48 is ON, it allows the supply of electric power from the drive module 36 to the power generation module 38.

When each switch 48 is ON, electric power is supplied from each battery 30 to the motor generator 42. As a result, the motor generator 42 is operated to start the engine 40. When the engine 40 is operating, the electric power generated by the motor generator 42 is supplied to each battery 30 and each electric motor 32. As a result, each battery 30 is charged. In addition, each electric motor 32 is operated.

FIGS. 2 and 3 show the outline of the power supply system 24. In the power supply system 24 shown in FIGS. 2 and 3, some members are omitted. The omitted members include, for example, electrical loads other than the electric motors 32, resistors, coils, capacitors, various sensors, fuses, relays, breakers, precharge circuits, DC-DC converters, and the like.

Configuration of Rotor Control Device

Figure 4:
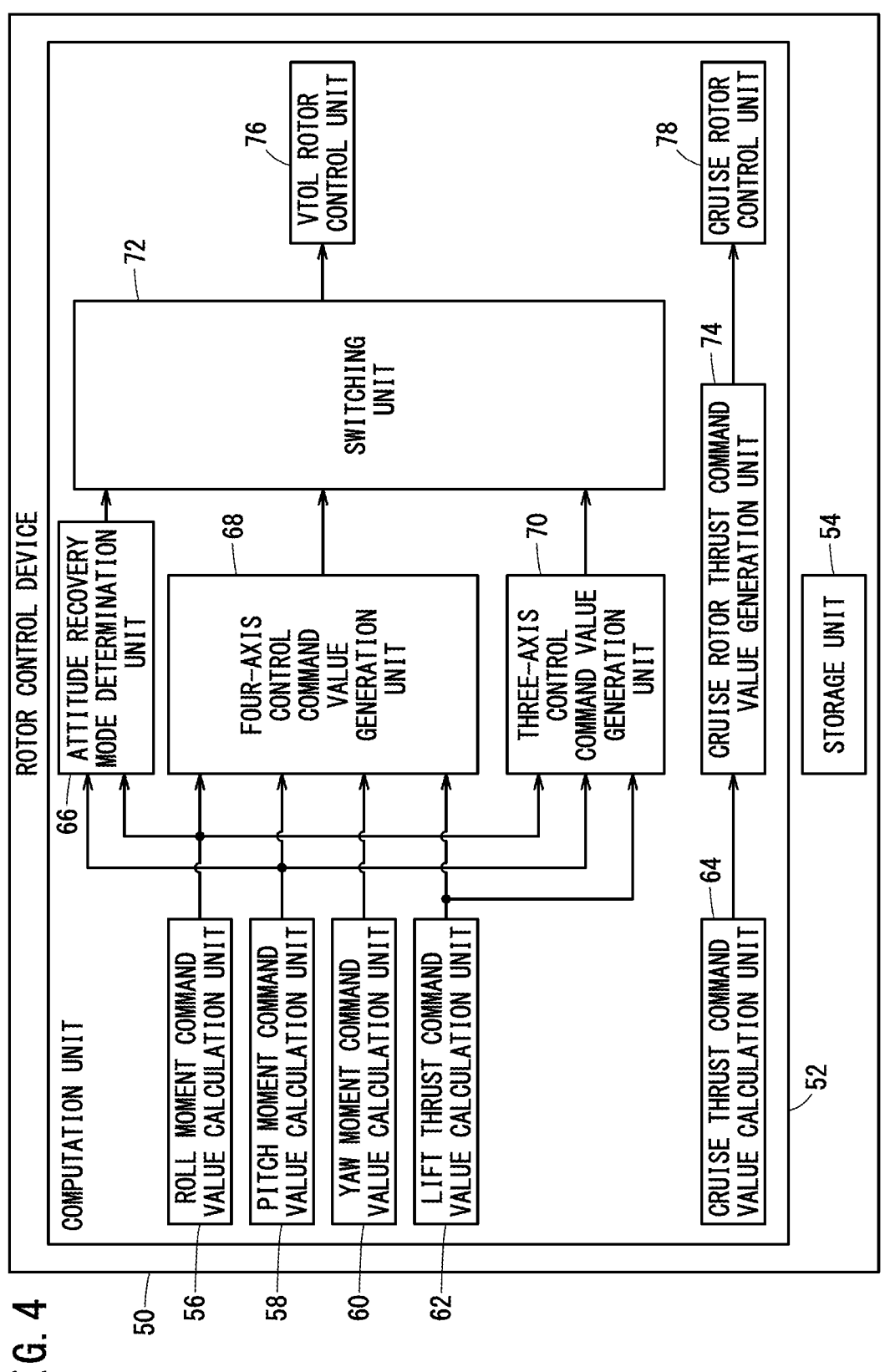
FIG. 4 is a control block diagram of a rotor control device.

FIG. 4 is a control block diagram of a rotor control device 50. The rotor control device 50 performs rotor control to adjust the thrust of each VTOL rotor 18. The rotor control device 50 corresponds to an attitude control device of the present invention. The rotor control device 50 includes a computation unit 52 and a storage unit 54.

The computation unit 52 is, for example, a processor such as a central processing unit (CPU) or a graphics processing unit (GPU). The computation unit 52 includes a roll moment command value calculation unit 56, a pitch moment command value calculation unit 58, a yaw moment command value calculation unit 60, a lift thrust command value calculation unit 62, a cruise thrust command value calculation unit 64, an attitude recovery mode determination unit 66, a four-axis control command value generation unit 68, a three-axis control command value generation unit 70, a switching unit 72, a cruise rotor thrust command value generation unit 74, a VTOL rotor control unit 76, and a cruise rotor control unit 78.

The roll moment command value calculation unit 56, the pitch moment command value calculation unit 58, the yaw moment command value calculation unit 60, the lift thrust command value calculation unit 62, the cruise thrust command value calculation unit 64, the attitude recovery mode determination unit 66, the four-axis control command value generation unit 68, the three-axis control command value generation unit 70, the switching unit 72, the cruise rotor thrust command value generation unit 74, the VTOL rotor control unit 76, and the cruise rotor control unit 78 are realized by the computation unit 52 executing programs stored in the storage unit 54.

At least part of the roll moment command value calculation unit 56, the pitch moment command value calculation unit 58, the yaw moment command value calculation unit 60, the lift thrust command value calculation unit 62, the cruise thrust command value calculation unit 64, the attitude recovery mode determination unit 66, the four-axis control command value generation unit 68, the three-axis control command value generation unit 70, the switching unit 72, the cruise rotor thrust command value generation unit 74, the VTOL rotor control unit 76, and the cruise rotor control unit 78 may be realized by an integrated circuit such as an application specific integrated circuit (ASIC) or a field-programmable gate array (FPGA).

At least part of the roll moment command value calculation unit 56, the pitch moment command value calculation unit 58, the yaw moment command value calculation unit 60, the lift thrust command value calculation unit 62, the cruise thrust command value calculation unit 64, the attitude recovery mode determination unit 66, the four-axis control command value generation unit 68, the three-axis control command value generation unit 70, the switching unit 72, the cruise rotor thrust command value generation unit 74, the VTOL rotor control unit 76, and the cruise rotor control unit 78 may be realized by an electronic circuit including a discrete device.

The storage unit 54 is configured by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least a part of the storage unit 54 may be included in the processor, the integrated circuit, or the like described above.

The roll moment command value calculation unit 56 calculates a roll moment command value. The roll moment command value is determined in accordance with an operation amount of an operation input unit by the pilot. The operation input unit is, for example, a control stick, a pedal, a lever, or the like. The operation amount of the operation input unit and the roll moment command value may not have a one to-one correspondence. The roll moment command value may be variable with respect to the operation amount of the operation input unit in accordance with the operation range of the operation input unit, the operation speed of the operation input unit, the angular velocity of the fuselage 12, and the like. The angular velocity of the fuselage 12 is detected by, for example, a gyro sensor (not shown).

When there is no operation input to the operation input unit by the pilot, the roll moment command value may be automatically determined and hovering may be performed regardless of the operation amount of the operation input unit. Further, when the aircraft 10 is automatically controlled, the roll moment command value may be automatically determined in accordance with a preset flight path, regardless of the operation amount of the operation input unit.

The pitch moment command value calculation unit 58 calculates a pitch moment command value. The pitch moment command value is determined in accordance with, for example, the operation amount of the operation input unit by the pilot. The operation amount of the operation input unit and the pitch moment command value may not have a one to-one correspondence. The pitch moment command value may be variable with respect to the operation amount of the operation input unit in accordance with the operation range of the operation input unit, the operation speed of the operation input unit, the angular velocity of the fuselage 12, and the like.

When there is no operation input to the operation input unit by the pilot, the pitch moment command value may be automatically determined and hovering may be performed regardless of the operation amount of the operation input unit. Further, when the aircraft 10 is automatically controlled, the pitch moment command value may be automatically determined in accordance with the preset flight path, regardless of the operation amount of the operation input unit.

The yaw moment command value calculation unit 60 calculates a yaw moment command value. The yaw moment command value is determined in accordance with, for example, the operation amount of the operation input unit by the pilot. The operation amount of the operation input unit and the yaw moment command value may not have a one to-one correspondence. The yaw moment command value may be variable with respect to the operation amount of the operation input unit in accordance with the operation range of the operation input unit, the operation speed of the operation input unit, the angular velocity of the fuselage 12, and the like.

When there is no operation input to the operation input unit by the pilot, the yaw moment command value may be automatically determined and hovering may be performed regardless of the operation amount of the operation input unit. Further, when the aircraft 10 is automatically controlled, the yaw moment command value may be automatically determined in accordance with the preset flight path, regardless of the operation amount of the operation input unit.

The lift thrust command value calculation unit 62 calculates a lift thrust command value. The lift thrust command value is determined in accordance with, for example, the operation amount of the operation input unit by the pilot. The operation amount of the operation input unit and the lift thrust command value may not have a one to-one correspondence. The lift thrust command value may be variable with respect to the operation amount of the operation input unit in accordance with the operation range of the operation input unit, the operation speed of the operation input unit, the altitude of the aircraft 10, and the like. The altitude of the aircraft 10 is estimated based on, for example, a distance between the aircraft 10 and the ground detected by a ground distance meter (not shown). The altitude of the aircraft 10 is estimated based on, for example, signals received from a global navigation satellite system (GNSS).

When there is no operation input to the operation input unit by the pilot, the lift thrust command value may be automatically determined and hovering may be performed regardless of the operation amount of the operation input unit. Further, when the aircraft 10 is automatically controlled, the lift thrust command value may be automatically determined in accordance with the preset flight path, regardless of the operation amount of the operation input unit.

The cruise thrust command value calculation unit 64 calculates a cruise thrust command value. The cruise thrust command value is determined in accordance with, for example, the operation amount of the operation input unit by the pilot. The operation amount of the operation input unit and the cruise thrust command value may not have a one to-one correspondence. The cruise thrust command value may be variable with respect to the operation amount of the operation input unit in accordance with the operation range of the operation input unit, the operation speed of the operation input unit, the airspeed of the aircraft 10, and the like. The airspeed of the aircraft 10 is detected by, for example, an airspeed sensor (not shown).

When there is no operation input to the operation input unit by the pilot, the cruise thrust command value may be automatically determined and the aircraft 10 may fly at a constant speed. Further, when the aircraft 10 is automatically controlled, the cruise thrust command value may be automatically determined in accordance with the preset flight path, regardless of the operation amount of the operation input unit.

The attitude recovery mode determination unit 66 determines whether or not to execute an attitude recovery mode. Whether or not to execute the attitude recovery mode is determined according to the magnitude of the roll moment command value, the magnitude of the pitch moment command value, or the magnitude of a resultant moment command value. The attitude recovery mode determination unit 66 corresponds to a processor of the present invention. The resultant moment is a moment obtained by combining a moment in the roll direction having the magnitude of the roll moment command value, and a moment in the pitch direction having the magnitude of the pitch moment command value.

The attitude recovery mode determination unit 66 determines to execute the attitude recovery mode in the following case. This case is a case where it is determined that the magnitude of the roll moment command value is greater than a first threshold, a case where it is determined that the magnitude of the pitch moment command value is greater than a second threshold, or a case where it is determined that the magnitude of the resultant moment command value is greater than a third threshold.

Each of the first threshold, the second threshold, and the third threshold is a value determined in advance. The attitude recovery mode determination unit 66 may set each of the first threshold, the second threshold, and the third threshold variably in accordance with the state of each VTOL rotor 18. For example, when one or some of the eight VTOL rotors 18 fail, the attitude recovery mode determination unit 66 may decrease each of the first threshold, the second threshold, and the third threshold. For example, each of the first threshold, the second threshold, and the third threshold may be set according to the number of failed VTOL rotors 18 among the eight VTOL rotors 18. In addition, the attitude recovery mode determination unit 66 may set each of the first threshold, the second threshold, and the third threshold variably according to the airspeed of the aircraft 10. For example, each of the first threshold, the second threshold, and the third threshold may be increased as the airspeed increases.

The four-axis control command value generation unit 68 generates a thrust command value for each VTOL rotor 18. The four-axis control command value generation unit 68 generates a thrust command value based on the roll moment command value, the pitch moment command value, the yaw moment command value, and the lift thrust command value.

The three-axis control command value generation unit 70 generates a thrust command value for each VTOL rotor 18. The three-axis control command value generation unit 70 generates a thrust command value based on the roll moment command value, the pitch moment command value, and the lift thrust command value. That is, the three-axis control command value generation unit 70 generates the thrust command value without using the yaw moment command value.

When the attitude recovery mode is executed, the switching unit 72 selects the thrust command value generated by the three-axis control command value generation unit 70 and outputs the selected thrust command value to the VTOL rotor control unit 76. When the attitude recovery mode is not executed, the switching unit 72 selects the thrust command value generated by the four-axis control command value generation unit 68 and outputs the selected thrust command value to the VTOL rotor control unit 76.

The cruise rotor thrust command value generation unit 74 generates a thrust command value for each cruise rotor 22. The cruise rotor thrust command value generation unit 74 generates a thrust command value based on the cruise thrust command value.

The VTOL rotor control unit 76 controls the thrust of each VTOL rotor 18 based on the thrust command value for each VTOL rotor 18 generated by the four-axis control command value generation unit 68 or the three-axis control command value generation unit 70. The VTOL rotor control unit 76 corresponds to a processor of the present invention.

The cruise rotor control unit 78 controls the thrust of each cruise rotor 22 based on the thrust command value for each cruise rotor 22 generated by the cruise rotor thrust command value generation unit 74.

As described above, when executing the attitude recovery mode, the VTOL rotor control unit 76 controls the thrust of each VTOL rotor 18 based on the thrust command value generated without using the yaw moment command value. Therefore, as a result of the roll moment and the pitch moment being controlled, a yaw moment acts on the fuselage 12 due to the counter torque generated in each VTOL rotor 18. However, the direction and magnitude of the yaw moment are not guaranteed.

Thus, when the attitude recovery mode is executed, the thrust of each VTOL rotor 18 is not allocated for control of the yaw moment. Therefore, the thrust of each VTOL rotor 18 allocated for control of the roll moment and the pitch moment can be increased. As a result, it is possible to increase the difference in thrust between the VTOL rotors 18. Therefore, the attitude of the fuselage 12 can be stabilized in the roll direction and the pitch direction at an early stage.

Rotor Control

FIG. 5 is a flowchart showing a flow of a rotor control process performed by the rotor control device 50. The rotor control process is repeatedly executed at a predetermined cycle while the aircraft 10 is in flight.

In step S1, the four-axis control command value generation unit 68 generates a thrust command value for each VTOL rotor 18 based on four-axis control command values. Thereafter, the process proceeds to step S2. The four-axis control command values indicate four command values, namely, the roll moment command value, the pitch moment command value, the yaw moment command value, and the lift thrust command value.

In step S2, the three-axis control command value generation unit 70 generates a thrust command value for each VTOL rotor 18 based on three-axis control command values. Thereafter, the process proceeds to step S3. The three-axis control command values indicate three command values, namely, the roll moment command value, the pitch moment command value, and the lift thrust command value.

In step S3, the cruise rotor thrust command value generation unit 74 generates a thrust command value for each cruise rotor 22 based on the cruise thrust command value. Thereafter, the process proceeds to step S4.

In step S4, the attitude recovery mode determination unit 66 determines whether or not to execute the attitude recovery mode. When the attitude recovery mode is executed, the process proceeds to step S6. When the attitude recovery mode is not executed, the process proceeds to step S5.

When the attitude recovery mode is not executed, then in step S5, the VTOL rotor control unit 76 controls the thrust of each VTOL rotor 18 based on the thrust command value corresponding to each VTOL rotor 18 and generated based on the four-axis control command values. Thereafter, the process proceeds to step S7.

When the attitude recovery mode is executed, then in step S6, the VTOL rotor control unit 76 controls the thrust of each VTOL rotor 18 based on the thrust command value corresponding to each VTOL rotor 18 and generated based on the three-axis control command values. Thereafter, the process proceeds to step S7.

In step S7, the cruise rotor control unit 78 controls the thrust of each cruise rotor 22 based on the thrust command value corresponding to each cruise rotor 22. Thereafter, the rotor control is ended.

Advantageous Effects

In the aircraft 10 of the present embodiment, the rotor control device 50 causes a roll moment, a pitch moment, and a yaw moment to act on the fuselage 12 by generating a difference in thrust between the eight VTOL rotors 18. Thus, the rotor control device 50 performs attitude control for stabilizing the attitude of the fuselage 12. Even when attitude control of the fuselage 12 is performed, it is necessary to ensure lift thrust generated by the eight VTOL rotors 18 in order to prevent sudden descent of the aircraft 10. The ratio of the thrust generated by each VTOL rotor 18 to ensure the lift thrust, to the upper limit of the thrust of each VTOL rotor 18, is high. Therefore, there may be a case where it is not possible to generate a sufficient difference in thrust between the plurality of VTOL rotors 18 while ensuring the lift thrust.

The rotor control device 50 of the present embodiment gives priority to stabilizing the attitude of the fuselage 12 in the roll direction and the pitch direction over stabilizing the attitude of the fuselage 12 in the yaw direction. This is mainly due to the following reasons. The reason is that the angle of the direction of the lift thrust with respect to the vertical direction increases when the attitude of the fuselage 12 is lost in the roll direction or the pitch direction. In this case, the fuselage 12 cannot obtain sufficient lift from the VTOL rotors 18. On the other hand, when the attitude of the fuselage 12 is lost in the yaw direction, the influence on the lift acting on the fuselage 12 is small.

Therefore, in the following case, the rotor control device 50 of the present embodiment controls the thrust of each VTOL rotor 18 based on the thrust command value that is generated based on the three-axis control command values. This case is a case where the magnitude of the roll moment command value is greater than the first threshold, a case where the magnitude of the pitch moment command value is greater than the second threshold, or a case where the magnitude of the resultant moment command value is greater than the third threshold. The three-axis control command values indicate three command values, namely, the roll moment command value, the pitch moment command value, and the lift thrust command value. That is, the rotor control device 50 performs the attitude control without using the yaw moment command value.

This allows more thrust to be distributed to each VTOL rotor 18 for control of the roll moment and the pitch moment. As a result, it is possible to increase the difference in thrust between the VTOL rotors 18. Therefore, the attitude of the fuselage 12 can be stabilized in the roll direction and the pitch direction at an early stage.

In addition, in a case where the attitude of the fuselage 12 is stabilized to some extent in the roll direction and the pitch direction, the rotor control device 50 of the present embodiment controls the thrust of each VTOL rotor 18 based on the thrust command value that is generated based on the four-axis control command values. The case where the attitude of the fuselage 12 is stabilized to some extent in the roll direction and the pitch direction is a case where the magnitude of the roll moment command value is equal to or less than the first threshold and a case where the magnitude of the pitch moment command value is equal to or less than the second threshold. Alternatively, the case where the attitude of the fuselage 12 is stabilized to some extent in the roll direction and the pitch direction is a case where the magnitude of the resultant moment command value is equal to or less than the third threshold. The four-axis control command values indicate four command values, namely, the roll moment command value, the pitch moment command value, the lift thrust command value, and the yaw moment command value. That is, the rotor control device 50 performs the attitude control based on the yaw moment command value.

As a result, in the case where the attitude of the fuselage 12 is stabilized to some extent in the roll direction and the pitch direction, the rotor control device 50 of the present embodiment can stabilize the attitude of the fuselage 12 also in the yaw direction.

In addition, in the rotor control device 50 of the present embodiment, the attitude recovery mode determination unit 66 decreases each of the first threshold, the second threshold, and the third threshold when one or some of the eight VTOL rotors 18 fail. As a result, the rotor control device 50 performs the attitude control at an early stage without using the yaw moment command value. Therefore, even when one or some of the VTOL rotors 18 fail, the rotor control device 50 of the present embodiment can stabilize the attitude of the fuselage 12 in the roll direction and the pitch direction at an early stage.

Further, in the rotor control device 50 of the present embodiment, the attitude recovery mode determination unit 66 increases each of the first threshold, the second threshold, and the third threshold as the airspeed of the aircraft 10 increases. As the airspeed of the aircraft 10 increases, the efficiency of the VTOL rotors 18 increases. Therefore, when the output power of the electric motors 32 that drive the VTOL rotors 18 is constant, the roll moment and the pitch moment acting on the fuselage 12 increase as the airspeed of the aircraft 10 increases. Thus, as the airspeed of the aircraft 10 increases, the output power of the electric motors 32 used for the attitude control in the roll direction and the attitude control in the pitch direction decreases, and the output power of the electric motors 32 can be distributed for the attitude control in the yaw direction.

The attitude recovery mode determination unit 66 increases the first threshold, the second threshold, and the third threshold, whereby the attitude control in the yaw direction by the VTOL rotors 18 is performed for a longer time. As a result, the rotor control device 50 of the present embodiment can stabilize the attitude of the fuselage 12 in the yaw direction by the VTOL rotors 18 while stabilizing the attitude of the fuselage 12 in the roll direction and the pitch direction by the VTOL rotors 18.

Second Embodiment

When executing the attitude recovery mode, the rotor control device 50 of the first embodiment generates the thrust command value for each VTOL rotor 18 based on the three-axis control command values. The three-axis control command values do not include the yaw moment command value.

On the other hand, even when executing the attitude recovery mode, the rotor control device 50 of the present embodiment generates the thrust command value for each VTOL rotor 18 based on the four-axis control command values. The four-axis control command values include the yaw moment command value. However, when the attitude recovery mode is executed, a corrected yaw moment command value is used.

Configuration of Rotor Control Device

Figure 6:
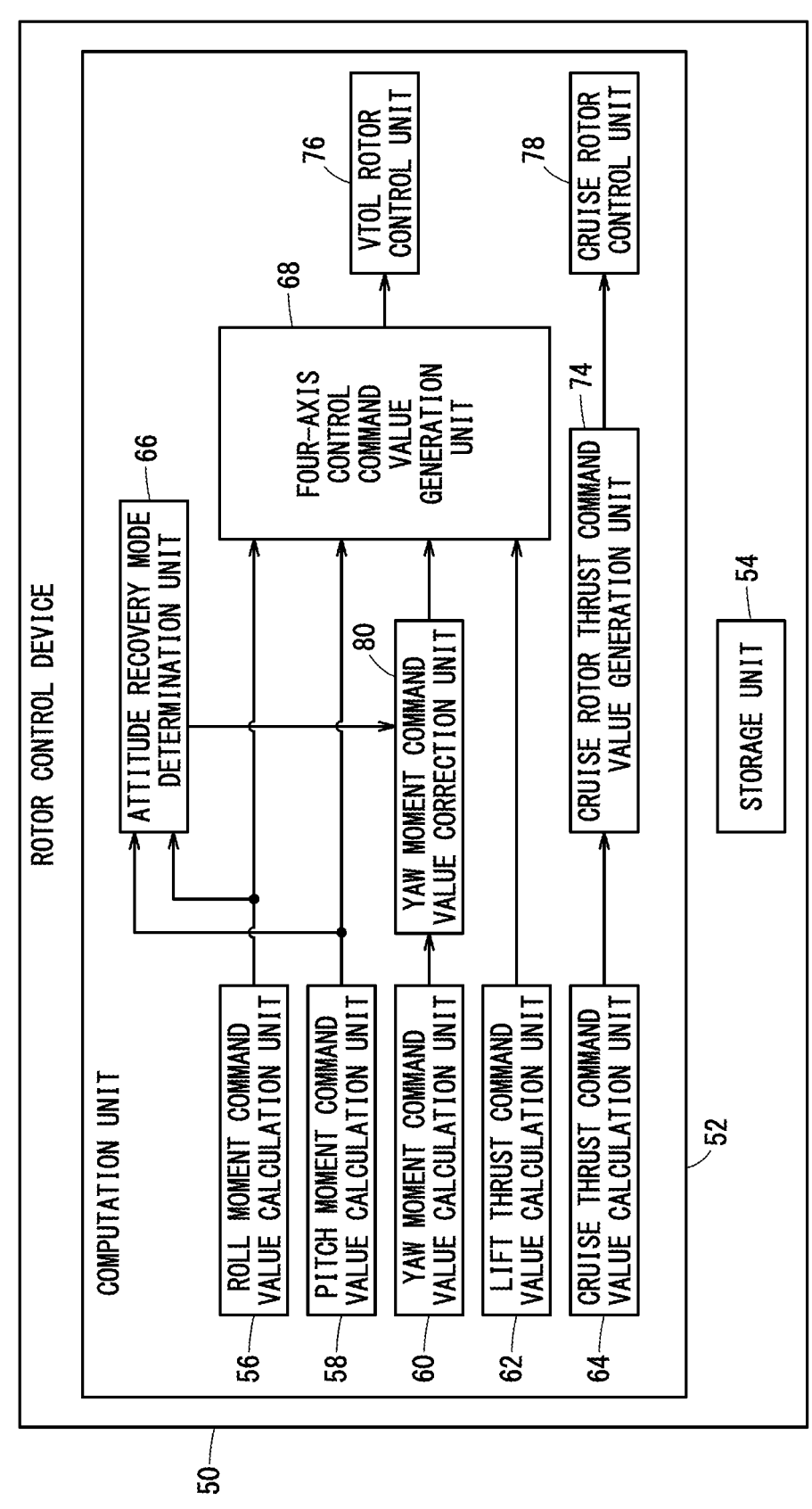
FIG. 6 is a control block diagram of the rotor control device.

FIG. 6 is a control block diagram of the rotor control device 50. The rotor control device 50 includes the computation unit 52 and the storage unit 54.

The computation unit 52 includes the roll moment command value calculation unit 56, the pitch moment command value calculation unit 58, the yaw moment command value calculation unit 60, the lift thrust command value calculation unit 62, the cruise thrust command value calculation unit 64, the attitude recovery mode determination unit 66, a yaw moment command value correction unit 80, the four-axis control command value generation unit 68, the cruise rotor thrust command value generation unit 74, the VTOL rotor control unit 76, and the cruise rotor control unit 78.

The roll moment command value calculation unit 56, the pitch moment command value calculation unit 58, the yaw moment command value calculation unit 60, the lift thrust command value calculation unit 62, the cruise thrust command value calculation unit 64, the attitude recovery mode determination unit 66, the four-axis control command value generation unit 68, the cruise rotor thrust command value generation unit 74, and the cruise rotor control unit 78 are the same as those of the first embodiment.

When the attitude recovery mode is executed, the yaw moment command value correction unit 80 corrects the yaw moment command value so that the magnitude of the yaw moment command value is reduced, and outputs the corrected yaw moment command value to the four-axis control command value generation unit 68. When the attitude recovery mode is executed, the yaw moment command value correction unit 80 may correct the yaw moment command value so that the magnitude of the yaw moment command value becomes 0. When the attitude recovery mode is not executed, the yaw moment command value correction unit 80 outputs the yaw moment command value to the four-axis control command value generation unit 68 without correcting the yaw moment command value.

The VTOL rotor control unit 76 controls the thrust of each VTOL rotor 18 based on the thrust command value for each VTOL rotor 18 generated by the four-axis control command value generation unit 68.

In the rotor control device 50 of the first embodiment, when the attitude recovery mode is executed, the VTOL rotor control unit 76 controls the thrust of each VTOL rotor 18 using the thrust command value generated without using the yaw moment command value. Therefore, as a result of the roll moment and the pitch moment being controlled, a yaw moment acts on the fuselage 12 due to the counter torque generated in each VTOL rotor 18. As a result, according to the first embodiment, there is a possibility that the attitude of the fuselage 12 in the yaw direction becomes more unstable while the attitude recovery mode is being executed.

On the other hand, in the rotor control device 50 of the present embodiment, when the attitude recovery mode is executed, although the magnitude of the yaw moment command value is corrected to be reduced, the VTOL rotor control unit 76 controls the thrust of each VTOL rotor 18 using the thrust command value generated based on the yaw moment command value. Therefore, according to the present embodiment, while the attitude recovery mode is being executed, a yaw moment that resists an external force that causes the attitude of the fuselage 12 to change in the yaw direction cannot be applied to the fuselage 12, but it is possible to suppress an unintended increase in the speed of attitude change in the yaw direction.

Rotor Control

Figure 7:
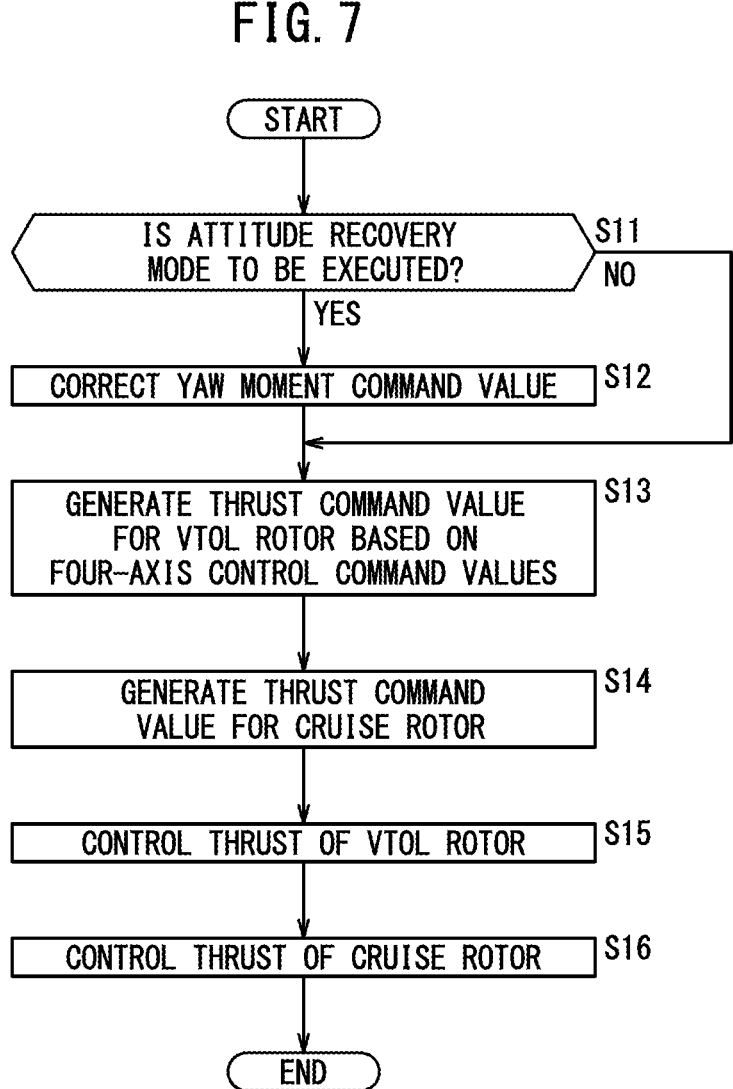
FIG. 7 is a flowchart showing a flow of the rotor control process performed by the rotor control device.

FIG. 7 is a flowchart showing a flow of the rotor control process performed by the rotor control device 50. The rotor control process is repeatedly executed at a predetermined cycle while the aircraft 10 is in flight.

In step S11, the attitude recovery mode determination unit 66 determines whether or not to execute the attitude recovery mode. When the attitude recovery mode is executed, the process proceeds to step S12. When the attitude recovery mode is not executed, the process proceeds to step S13.

When the attitude recovery mode is executed, the yaw moment command value correction unit 80 corrects the yaw moment command value so that the magnitude of the yaw moment command value is reduced in step S12. Thereafter, the process proceeds to step S13.

In step S13, the four-axis control command value generation unit 68 generates a thrust command value for each VTOL rotor 18 based on the four-axis control command values. Thereafter, the process proceeds to step S14. The four-axis control command values indicate four command values, namely, the roll moment command value, the pitch moment command value, the yaw moment command value, and the lift thrust command value. When the yaw moment command value has been corrected in step S12, the corrected yaw moment command value is used.

In step S14, the cruise rotor thrust command value generation unit 74 generates a thrust command value for each cruise rotor 22. The cruise rotor thrust command value generation unit 74 generates a thrust command value based on the cruise thrust command value. Thereafter, the process proceeds to step S15.

In step S15, the VTOL rotor control unit 76 controls the thrust of each VTOL rotor 18 based on the thrust command value for each VTOL rotor 18. Thereafter, the process proceeds to step S16.

In step S16, the cruise rotor control unit 78 controls the thrust of each cruise rotor 22 based on the thrust command value for each cruise rotor 22. Thereafter, the rotor control is ended.

Advantageous Effects

The rotor control device 50 of the present embodiment controls the thrust of each VTOL rotor 18 based on each thrust command value generated based on the four-axis control command values. The four-axis control command values indicate four command values, namely, the roll moment command value, the pitch moment command value, the yaw moment command value, and the lift thrust command value. However, in the following case, the rotor control device 50 corrects the yaw moment command value so that the magnitude of the yaw moment command value is reduced. This case is a case where the magnitude of the roll moment command value is greater than the first threshold, a case where the magnitude of the pitch moment command value is greater than the second threshold, or a case where the magnitude of the resultant moment command value is greater than the third threshold.

This makes it possible to reduce the control amount of the attitude control in the yaw direction. Therefore, the rotor control device 50 of the present embodiment can stabilize the attitude of the fuselage 12 in the roll direction and the pitch direction at an early stage.

Invention Obtained from Embodiments

The invention that can be grasped from the above embodiments will be described below.

According to the present invention, provided is the attitude control device (50) that performs attitude control of the fuselage (12) of the aircraft (10) including the plurality of rotors (18) each configured to generate thrust in the vertical direction, the attitude control device including: the roll moment command value calculation unit (56) configured to calculate the command value of the roll moment to be applied to the fuselage; the pitch moment command value calculation unit (58) configured to calculate the command value of the pitch moment to be applied to the fuselage; the yaw moment command value calculation unit (60) configured to calculate the command value of the yaw moment to be applied to the fuselage; the rotor control unit (76) configured to control each of the rotors based on the command value of the roll moment, the command value of the pitch moment, and the command value of the yaw moment; and the determination unit (66) configured to make one of: a determination as to whether or not the magnitude of the command value of the roll moment is equal to or greater than the first threshold; a determination as to whether or not the magnitude of the command value of the pitch moment is equal to or greater than the second threshold; or a determination as to whether or not the magnitude of the command value of the resultant moment obtained from the command value of the roll moment and the command value of the pitch moment is equal to or greater than the third threshold, wherein when the magnitude of the command value of the roll moment is determined to be equal to or greater than the first threshold by the determination unit, when the magnitude of the command value of the pitch moment is determined to be equal to or greater than the second threshold by the determination unit, or when the magnitude of the command value of the resultant moment is determined to be equal to or greater than the third threshold by the determination unit, the rotor control unit controls each of the rotors based on the command value of the roll moment and the command value of the pitch moment without using the command value of the yaw moment, or the rotor control unit corrects the command value of the yaw moment so that the magnitude of the command value of the yaw moment is reduced, and controls each of the rotors based on the command value of the roll moment, the command value of the pitch moment, and the command value of the yaw moment that has been corrected. According to this feature, the attitude of the fuselage can be stabilized in the roll direction and the pitch direction at an early stage.

In the above-described attitude control device, when the magnitude of the command value of the yaw moment is corrected to be reduced, the rotor control unit may set the magnitude of the command value of the yaw moment to 0.

According to this feature, the attitude of the fuselage can be stabilized in the roll direction and the pitch direction at an early stage.

In the above-described attitude control device, the determination unit may make at least one of the first threshold, the second threshold, or the third threshold variable. According to this feature, the attitude of the fuselage can be stabilized in the roll direction and the pitch direction at an early stage.

In the above-described attitude control device, the determination unit may make at least one of the first threshold, the second threshold, or the third threshold variable according to the number of the rotors that have failed. According to this feature, the attitude of the fuselage can be stabilized in the roll direction and the pitch direction at an early stage.

The present invention is not limited to the above disclosure, and various modifications are possible without departing from the essence and gist of the present invention.

The invention claimed is:

1. An aircraft comprising:

a plurality of rotors each configured to generate thrust in a vertical direction;

a gyro sensor mounted on the aircraft; and an attitude control device that performs attitude control of a fuselage of the aircraft including the plurality of rotors, the attitude control device comprising one or more processors that execute computer-executable instructions stored in a memory, wherein the one or more processors execute the computer-executable instructions to perform:

a command value calculation process that, based on an angular velocity of the fuselage detected by the gyro sensor, automatically calculates a command value of a roll moment to be applied to the fuselage, automatically calculates a command value of a pitch moment to be applied to the fuselage, and automatically calculates a command value of a yaw moment to be applied to the fuselage; and a determination process that makes one of:

a determination as to whether or not a magnitude of the command value of the roll moment is equal to or greater than a first threshold;

a determination as to whether or not a magnitude of the command value of the pitch moment is equal to or greater than a second threshold; or a determination as to whether or not a magnitude of a command value of a resultant moment obtained from the command value of the roll moment and the command value of the pitch moment is equal to or greater than a third threshold, and when the magnitude of the command value of the roll moment is determined to be equal to or greater than the first threshold, when the magnitude of the command value of the pitch moment is determined to be equal to or greater than the second threshold, or when the magnitude of the command value of the resultant moment is determined to be equal to or greater than the third threshold, the one or more processors performs an attitude recovery mode that:

controls each of the plurality of rotors based on the command value of the roll moment and the command value of the pitch moment without using the command value of the yaw moment, or corrects the command value of the yaw moment calculated in the command value calculation process in a manner so that a magnitude of the command value of the yaw moment is reduced and controls each of the plurality of rotors based on the command value of the roll moment, the command value of the pitch moment, and the command value of the yaw moment that has been corrected.

2. The aircraft according to claim 1, wherein in the attitude recovery mode, when correcting the command value of the yaw moment in the manner so that the magnitude of the command value of the yaw moment is reduced, the one or more processors cause the attitude control device to set the magnitude of the command value of the yaw moment to 0.

3. The aircraft according to claim 1, wherein the one or more processors cause the attitude control device to make at least one of the first threshold, the second threshold, or the third threshold variable.

4. The aircraft according to claim 3, wherein the one or more processors cause the attitude control device to make at least one of the first threshold, the second threshold, or the third threshold variable according to a number of the rotors that have failed.

5. The aircraft according to claim 1, wherein the determination process and the attitude recovery mode are performed in a case where at least one of the plurality of rotors fails.

6. The attitude control device according to claim 5, wherein at least one of the first threshold, the second threshold, or the third threshold is set according to a number of the rotors that fails.

7. The attitude control device according to claim 1, wherein the determination process and the attitude recovery mode are performed during vertical take-off, vertical landing, or hovering of the aircraft.

8. The attitude control device according to claim 1, wherein the command value calculation process, the determination process, and the attitude recovery mode are performed in a case where there is no operation input to an operation input unit by a pilot.

* * * * *